(12) United States Patent
Coryell

(10) Patent No.: US 6,422,641 B1
(45) Date of Patent: Jul. 23, 2002

(54) GOLF EQUIPMENT TRAILER

(75) Inventor: Timothy James Coryell, East Lansing, MI (US)

(73) Assignee: TeeCart, Inc., Lansing, MI (US)

( * ) Notice: Subject to any disclaimer, the term of this patent is extended or adjusted under 35 U.S.C. 154(b) by 0 days.

(21) Appl. No.: 09/921,684

(22) Filed: Aug. 3, 2001

(51) Int. Cl.[7] .............................................. B60R 27/00
(52) U.S. Cl. ................. 296/181; 280/656; 280/DIG. 6; 224/274
(58) Field of Search ......................... 296/181; 280/204, 280/400, 656, DIG. 6, DIG. 5; 224/413, 274

(56) References Cited

U.S. PATENT DOCUMENTS

| | | |
|---|---|---|
| 3,937,489 A | 2/1976 | Hawes et al. |
| 4,014,586 A | 3/1977 | Swofford |
| 4,057,283 A | 11/1977 | Barnett |
| 4,119,331 A * | 10/1978 | Jackson ................... 280/656 X |
| 4,170,370 A * | 10/1979 | Schaefer ..................... 280/400 |
| 4,536,001 A | 8/1985 | Wagner |
| 5,064,209 A * | 11/1991 | Kurschat ................... 280/204 |
| 5,207,361 A | 5/1993 | Slifka |
| 5,207,441 A | 5/1993 | Granbery |
| 5,226,657 A * | 7/1993 | Dolphin .................... 280/478.1 |
| 5,482,304 A | 1/1996 | Smith |
| 5,857,692 A * | 1/1999 | Hayes et al. ................. 280/410 |
| 6,149,041 A | 11/2000 | Perino et al. |
| 6,193,256 B1 | 2/2001 | Banary, Jr. |

* cited by examiner

Primary Examiner—Joseph D. Pape
Assistant Examiner—Jason Morrow
(74) Attorney, Agent, or Firm—Foster, Swift, Collins & Smith, P.C.; John M. Naber

(57) ABSTRACT

The invention is an improved trailer adapted for golf equipment. The preferred embodiment has a chassis with wheels having a braking and suspension system and a trailer tongue with a hitch to attach to a motorcycle or a golf cart. An aerodynamic housing provides insulated storage accessed by a hingedly mounted seat. The housing also contains a golf bag seat with means to support and secure a plurality of golf bags. A collapsible or detachable roof, signal lights, additional storage baskets, and a golf ball washer can also be added. The brakes can be configured to activate when the roof or a seat back is raised. The invention can be easily, economically, and efficiently manufactured and marketed using many components already manufactured for use on prior art golf carts.

17 Claims, 3 Drawing Sheets

GOLF EQUIPMENT TRAILER

BACKGROUND OF THE INVENTION

1. Field of the Invention

The present invention relates generally to trailers and specifically to an improved trailer adapted for golf equipment.

2. Discussion of the Prior Art

Trailers for motorcycles and the like are well known in the prior art. See generally, U.S. Pat. No. 3,937,489 to Hawes, et al.; U.S. Pat. No. 4,057,283 to Barnett; and U.S. Pat. No. 4,536,001 to Wagner. Further, the prior art has also attempted to address the specific problems associated with motorcycles and the transporting of golf equipment. U.S. Pat. No. 5,207,361 to Slifka describes a carrier to attach a golf bag directly to a motorcycle. U.S. Pat. No. 6,149,041 to Perino et al. describes a specialized golf bag with a split body that is carried by the operator of the motorcycle or bicycle. Even specialized golf equipment trailers for motorcycles have been attempted. U.S. Pat. No. 6,193,256 to Banary, Jr. describes a small golf equipment trailer for towing behind a motorcycle that has a small shelf, a small storage box, and a frame to hold a pair of golf bags.

Unfortunately, disadvantages remain for motorcyclists wishing to carry golf equipment. The prior art trailers have limited storage space; they are not aerodynamic; and they do not afford the user a place to change into their golf shoes, etc. upon arrival at a golf course. And finally, some golf courses wishing to save money on the purchase of golf carts are going to four bag golf carts forcing at least two players to walk rather than allowing two carts per foursome.

Thus, there is a need for an improved golf equipment trailer for a motorcycle or other vehicles to overcome the disadvantages found in the prior art and essentially provide all or even more conveniences associated with bringing an automobile to the golf course. Such a trailer could also be mounted to a back of a golf cart to provide additional seating to a foursome using a four bag golf cart.

SUMMARY OF THE INVENTION

Accordingly, the present invention provides an improved golf equipment trailer. It has many advantages and novel features not anticipated, rendered obvious, suggested, or even implied by any of the prior art golf equipment trailers, either alone or in any combination thereof.

The present invention in its preferred embodiment generally comprises a chassis having a pair of ground engaging wheels with a resilient suspension system to adjust to various loads and road conditions and a forwardly extending elongated trailer tongue adapted for coupling to a motorcycle trailer hitch and the like. The wheels can have a means to apply a braking force.

Above the chassis is mounted a floor and an improved housing. A storage area that can be insulated is defined by the shape of the housing. On the housing is a hingedly mounted user seat to access the storage area. Gas shocks or other means can hold the seat in an open or closed position. And, the seat can have arm rests or a seat back.

The housing also contains a golf bag seat having a lip for a plurality of golf bags rearward of a housing back wall, a golf bag support frame for a plurality of golf bags, a pair of side frames rearwardly located from the back frame, and a means to lock the plurality of golf bags in place. The locking means, such as a securing harness, can be adapted for securing upper portions of golf bags resting on the golf bag seat to the bag support frame.

Additional features of the present invention can include the housing with a pair of rearwardly facing signal lights being mounted to the housing back wall, a golf ball washer mounted to the elongated trailer tongue, and storage baskets mounted to the golf bag support frame.

To prohibit use of seats while the trailer is towed on public roads, the trailer can have means to apply a braking force to the ground engaging wheels when, for example, the seat back is raised or the collapsible roof is in its upright position.

The new golf equipment trailer can be easily, economically, and efficiently manufactured and marketed using many components already manufactured for use on prior art golf carts.

The present invention can have several other benefits and features. The present invention has minimal wind drag during transit to a golf course. It allows motorcycle enthusiasts to travel with their golf equipment on their motorcycles while having all the advantages enjoyed by individuals who bring their automobiles to the golf course.

The present invention can be towed behind a golf cart.

Other objects of the present invention will become more apparent to persons having ordinary skill in the art to which the present invention pertains from the following description taken in conjunction with the accompanying figures.

BRIEF DESCRIPTION OF THE FIGURES

The foregoing objects, advantages, and features, as well as other objects and advantages, will become apparent with reference to the description and figures below, in which like numerals represent like elements and in which.

DETAILED DESCRIPTION OF THE PREFERRED EMBODIMENT

Figure 1:
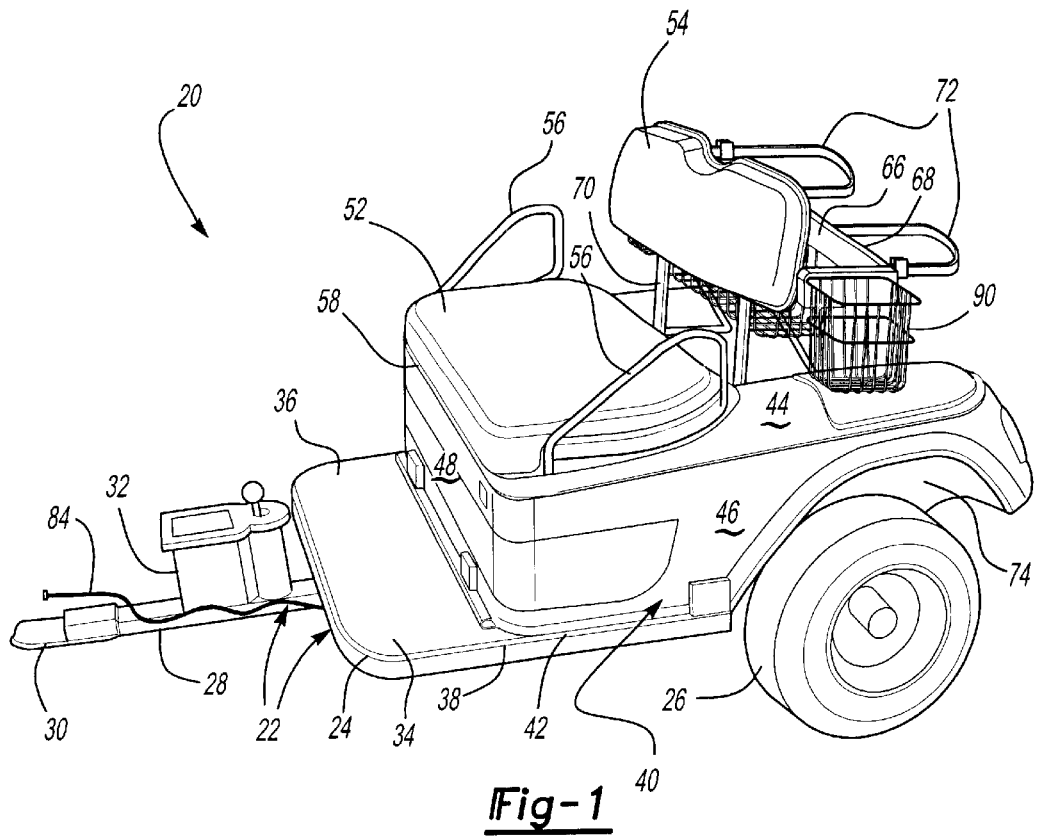
FIG. 1 illustrates a perspective view of the front of the golf equipment trailer of the present invention.
Figure 2:
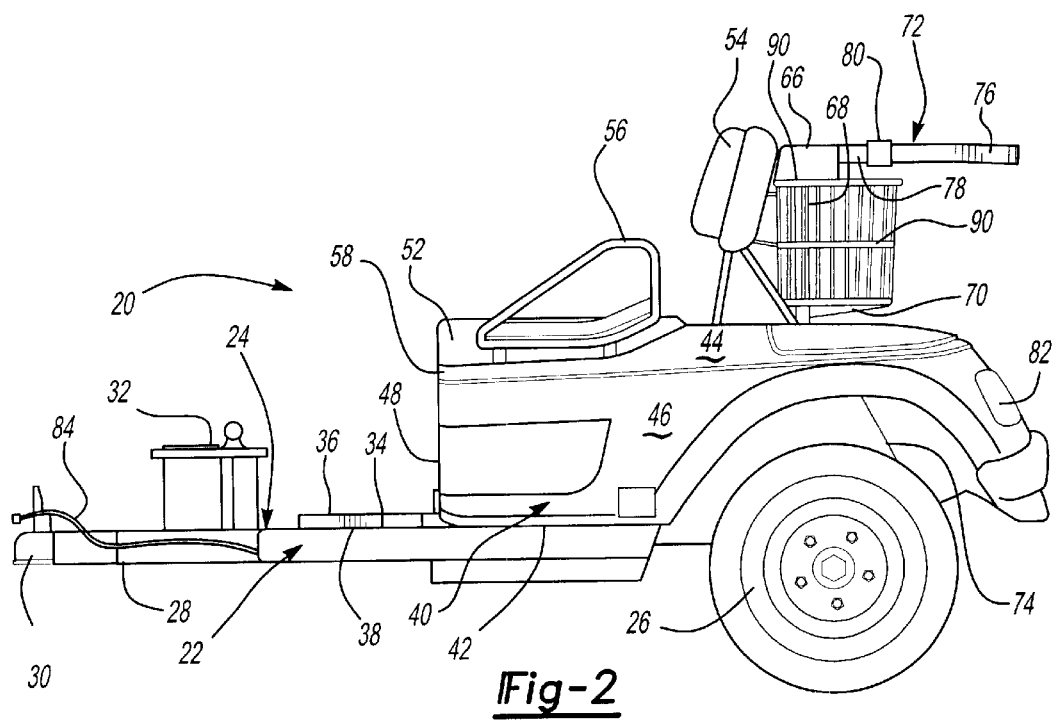
FIG. 2 illustrates a side view of the golf equipment trailer of the present invention.
Figure 3:
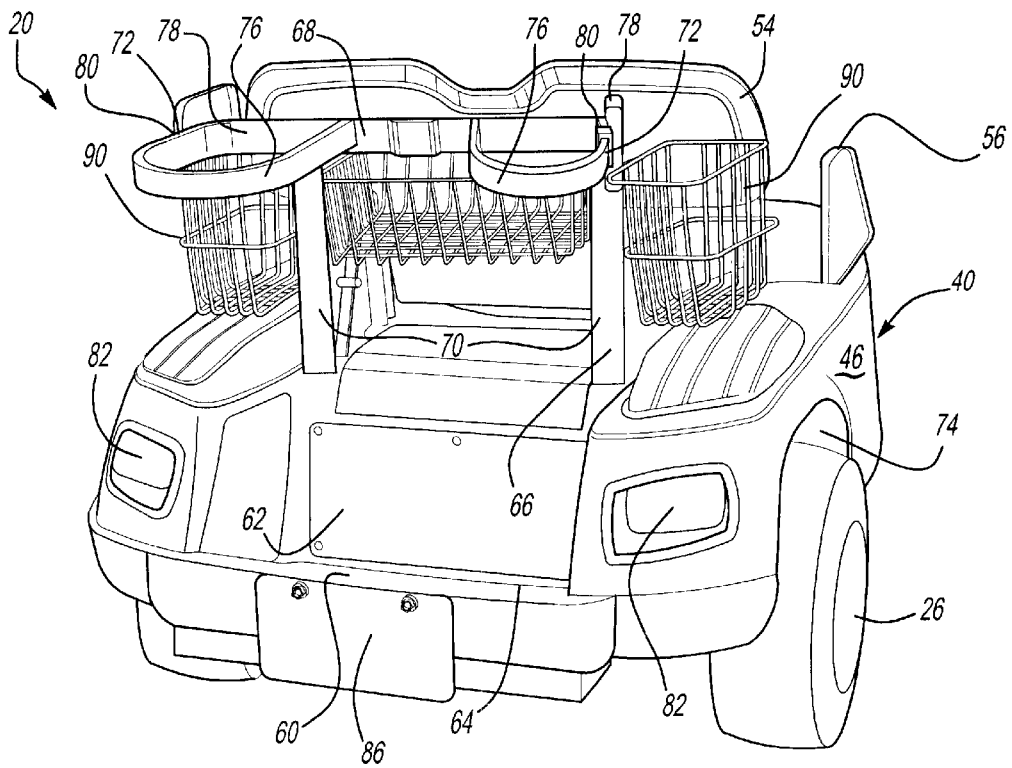
FIG. 3 illustrates a perspective view of the rear of the golf equipment trailer of the present invention.

The present invention relates to an improved trailer for golf equipment generally referenced as numeral 20 and generally illustrated by FIGS. 1 through 6 that embody its principles and concepts.

The illustrated embodiment of the trailer 20 has a chassis 22 with a top side 24 and a bottom side (not shown) having a pair of ground engaging wheels 26 and a forwardly extending elongated trailer tongue 28 with a hitch 30 adapted for coupling to a trailer hitch of a vehicle, such as a motorcycle, golf cart, or automobile (not shown). The chassis 22 can have a means to apply a braking force to the wheels 26 as well as a wheel suspension means (not shown). The tongue 28 can also permit mounting of a golf ball washer 32 that is well known in the prior art. The chassis 22 may have a resilient suspension system (not shown) to adjust to various loads and road conditions.

Figure 4:
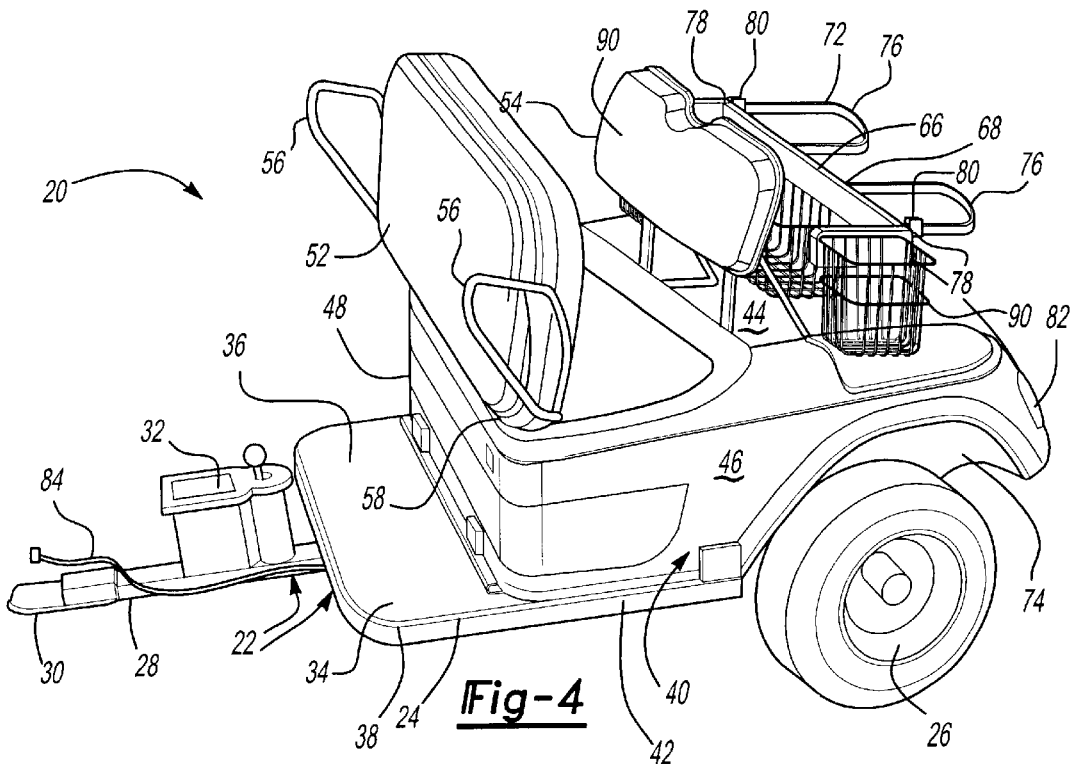
FIG. 4 illustrates a perspective view of the front of the golf equipment trailer of the present invention with the seat raised to expose the storage compartment.

Attached to the chassis top side 24 is a floor 34 having a floor top side 36 and a floor bottom side 38. The floor bottom side 38 is mounted to the chassis top side 24. Above the floor top side 36 is a housing 40 having a housing bottom side 42, a housing top side 44, a housing front wall 48, a housing back wall 62, and housing side walls 46. The rearward part of the housing side walls 46 has wheel wells 74 defined by the opening in the housing side walls 46, to accommodate the wheels 26. The housing bottom side 42 is mounted to the floor top side 36. The housing top side 44, housing bottom side 42, housing side walls 46, the housing front wall 48 and the housing back wall 62 define a storage area that can be lined with temperature insulating means and accessed through an opening 50 on the housing top side 44, which is best illustrated in FIG. 4. This allows the user to use the housing storage area, for example, as a cooler.

Hingedly mounted above and defining the housing top side opening 50 is a user seat 52. The user seat 52 can be configured to include a seat back 54 and armrests 56. A hinged seat mount 58, as is best illustrated in FIG. 4, is on a forward edge of the top side opening 50 so that the user seat 52 is held down by wind pressure during transit. In addition to the hinged seat mount 58, the user seat 52 may have a means to hold it in its present position in an open or closed position or any position in-between using, for example, prior art gas shocks 88 shown in FIG. 4. One skilled in the art could also easily include various latching means to hold the seat in any position.

There are several possible methods to secure golf bags (not shown) to the trailer 20 of the present invention. The preferred embodiment, best illustrated in FIG. 3, has a golf bag seat 60 rearward of the housing back wall 62 having a rearward upwardly extending lip 64 to secure two golf bags. The golf bag seat 60 is configured for resting a bottom of a golf bag. The lip 64 helps to hold the golf bag bottom to the golf bag seat 60 with minimal sideways motions.

Mounted to the housing top side 44 is a golf bag support frame 66 upwardly extended from the housing rearward of the user seat 52 with a back frame 68, a pair of side frames 70 rearwardly located from the back frame 68, and a means to secure the plurality of golf bags in place. The locking means is adapted for securing upper portions of golf bags resting on the golf bag seat 60 to the golf bag support frame 66. In the preferred embodiment, this locking means is two securing harnesses 72 well known in the prior art for use on golf carts attached to the side frames 70. Many other configurations are possible and may even need to be stronger if the user anticipates high speeds during transit.

Specifically, each securing harness 72 has a flexible strap 76 having opposite ends, one end being mounted to a middle region of a back frame 78 and the opposite end being releasably coupled to a coupling means 80 mounted at an end of one of the side frames 70. The strap forms a bag-securing loop positioned above the golf bag seat 60. In use, the golf bag support frame 66 should provide lateral and rear support to upper portions of the golf bags resting on the golf bag seat 60 to help prevent the golf bags from falling off of the trailer 20.

The design flexibility of the present invention allows for several modifications and features to improve performance and overall user satisfaction of the trailer 20. The golf bag support frame 66 can have additional storage devises such as baskets 90 attached in various configurations.

In the preferred embodiment, the housing 40 may have a pair of rearwardly facing signal lights 82 mounted to the back wall 62. Each of the signal lights 82 may include light sources for indicating braking and turning. In use, the signal lights 82 are designed for electrical connection to the turning and brake light system of a motorcycle towing the trailer 20. The electrical connection is made through an elongated electrical conduit 84 having a forward end positioned adjacent a front socket portion of the trailer tongue 28 and designed for electrical connection to the turning and brake light system of the motorcycle (not shown). A license plate holder and a light 86 may also be attached to, for example, the golf bag seat lip 64.

Figure 5:
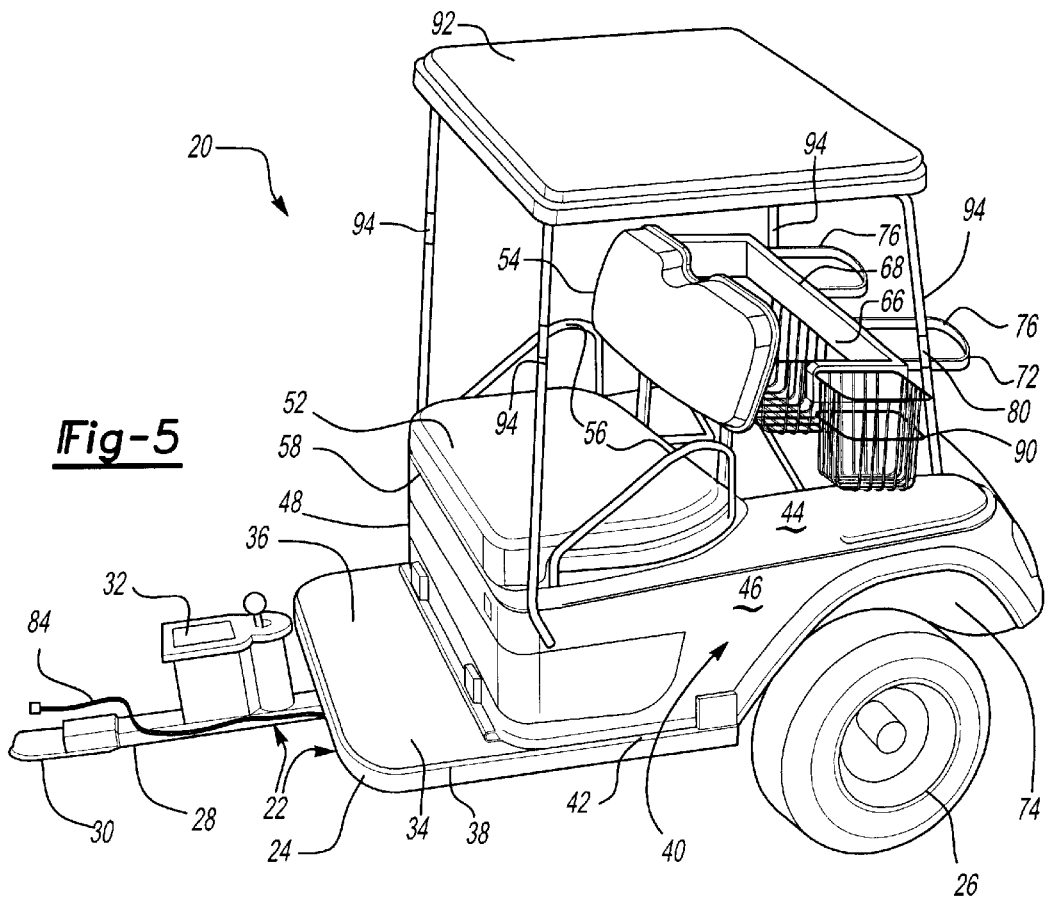
FIG. 5 illustrates a perspective view of the front of the golf equipment trailer of the present invention with the seat, lowered and a roof.
Figure 6:
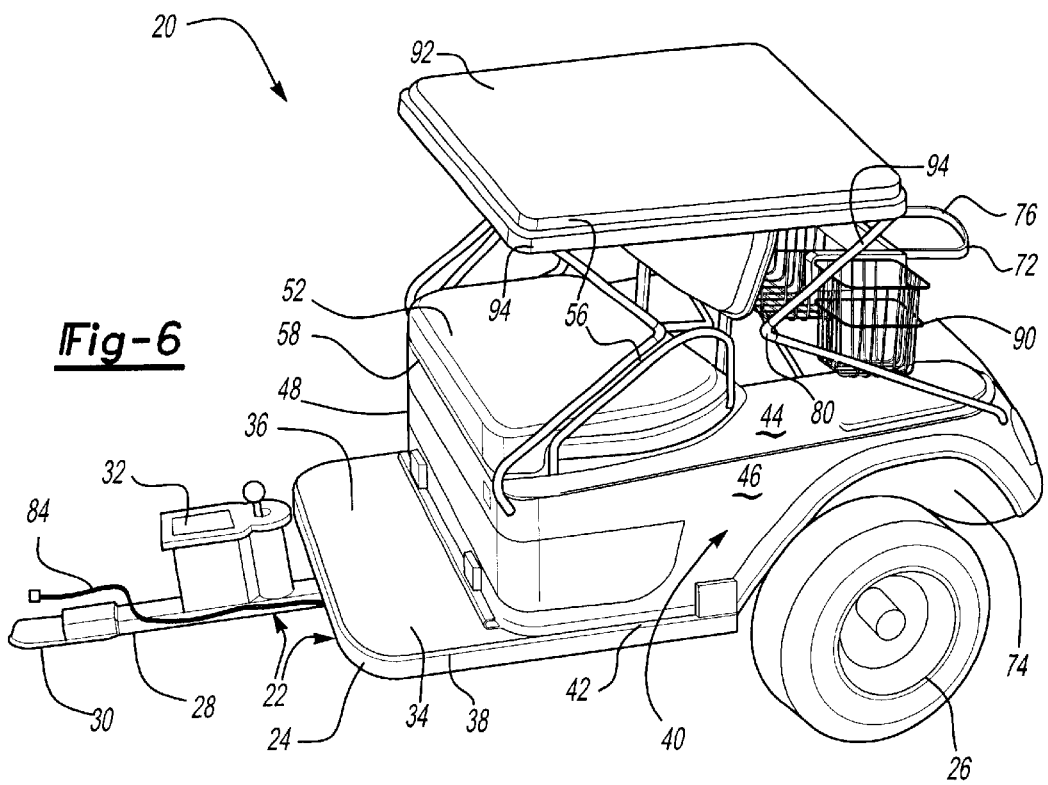
FIG. 6 illustrates a perspective view of the front of the golf equipment trailer of the present invention with the roof lowered.

FIG. 5 illustrates an alternate embodiment of the present invention adding a roof 92 mounted, for demonstration purposes only, to the chassis 22. A plurality of roof supports 94 can be detachable or collapsible (as illustrated in FIG. 6). When the roof 92 is extended, it covers the trailer 20, golf bags and its users, and collapses to a general height of a golf bag in a closed position (FIG. 6).

In alternate embodiments, it may be desirable to prevent trailer 20 movement such as when the roof 92 is raised or if a user is sitting on the seat 52. In such instances, a system could be added to the chassis 22 to apply a braking force to the wheels 26 when the hingedly mounted seat back 54 is raised to its normal position. To release the braking force, the seat back 54 would have to be pivoted down onto the hingedly mounted user seat 52. Alternatively, the braking force could be applied when the roof 92 is in its upright position and released only when it is in its closed position.

With respect to the above description, it is to be realized that optimum dimensional relationships for the parts of the invention include variations in size, materials, shape, form, function and manner of operation, assembly and use. They are deemed readily apparent and obvious to one skilled in the art, and all equivalent relationships to those illustrated in the drawings and described in the specification are intended to be encompassed by the present invention. The above-described embodiments of the invention are provided purely for purposes of example. Many other variations, modifications, and applications of the invention may be made.

I claim:

1. A trailer comprising:

a chassis having a top side and a bottom side, comprising a pair of ground engaging wheels and a forwardly extending elongated trailer tongue adapted for coupling to a trailer hitch;

a floor having a top side and a bottom side, the floor bottom side mounted to the chassis top side;

an housing having a bottom side, a top side having an opening, side walls, a front wall and a back wall, the housing bottom side mounted to the floor top side;

a housing storage area defined by the housing top side, bottom side, side walls, front wall and back wall;

the housing further comprising, a user seat hingedly mounted over and defining the housing top side opening, whereby a user can access the housing storage area;

the housing further comprising a golf bag seat for a plurality of golf bags rearward of the housing back wall;

a golf bag support frame mounted to and upwardly extended from the housing rearward of the user seat comprising a back frame, a pair of side frames rearwardly located from the back frame, and a means to lock the plurality of golf bags in place, the locking means being adapted for securing upper portions of golf bags resting on the golf bag seat to the golf bag support frame; and wheel wells defined by openings in the housing side walls.

2. The trailer of claim 1, wherein the seat for a plurality of golf bags has a rearward upwardly extending lip.

3. The trailer of claim 1, wherein the means to secure golf bags comprises a securing harness being mounted to the side frames for each golf bag.

4. The trailer of claim 3, comprising two securing harnesses.

5. The trailer of claim 3, wherein the securing harness comprises a flexible strap, having opposite ends, one end being mounted to a middle region of the back frame, the opposite end being releasably coupled to a coupling means mounted at an end of one of the side frames, the strap forming a bag securing loop positioned above the golf bag seat.

6. The trailer of claim 1 further comprising a pair of rearwardly facing signal lights being mounted to the housing back wall.

7. The trailer of claim 1, further comprising a chassis mounted roof to cover the trailer and its users.

8. The trailer of claim 7, wherein the roof is detachable.

9. The trailer of claim 7, wherein the roof is collapsible to cover the trailer, golf bags and its users in an upright position, and collapses to a general height of a golf bag in a closed position.

10. The trailer of claim 1, wherein the chassis further comprises a resilient suspension system for the ground engaging wheels.

11. The trailer of claim 1, wherein the hingedly mounted user seat further comprises a means to hold the seat in open or closed position.

12. The trailer of claim 11, wherein the means to hold the seat comprises the use of gas shocks.

13. The trailer of claim 1, wherein the housing walls defining the storage area-are lined with a temperature insulating means.

14. The trailer of claim 1, wherein the hingedly mounted user a seat further comprises arm rests mounted at each end.

15. The trailer of claim 1, wherein the housing further comprises a seat back mounted to the housing top side in a position rearward and parallel to the hingedly mounted user seat.

16. The trailer of claim 1, further comprising a golf ball washer mounted to the elongated trailer tongue.

17. The trailer of claim 1, further comprising storage baskets mounted to the golf bag support frame.

* * * * *